(12) United States Patent
Chao et al.

(10) Patent No.: US 7,203,202 B2
(45) Date of Patent: Apr. 10, 2007

(54) ARBITRATION USING DUAL ROUND ROBIN MATCHING WITH EXHAUSTIVE SERVICE OF WINNING VIRTUAL OUTPUT QUEUE

(75) Inventors: Hung-Hsiang Jonathan Chao, Holmdel, NJ (US); Yihan Li, Elmhurst, NY (US); Shivendra S. Panwar, Freehold, NJ (US)

(73) Assignee: Polytechnic University, Brooklyn, NY (US)

( * ) Notice: Subject to any disclaimer, the term of this patent is extended or adjusted under 35 U.S.C. 154(b) by 1030 days.

(21) Appl. No.: 10/285,332

(22) Filed: Oct. 31, 2002

(65) Prior Publication Data

US 2003/0165151 A1    Sep. 4, 2003

Related U.S. Application Data

(60) Provisional application No. 60/386,359, filed on Jun. 6, 2002, provisional application No. 60/335,503, filed on Oct. 31, 2001.

(51) Int. Cl.
*H04L 12/28* (2006.01)

(52) U.S. Cl. .................................. 370/414; 370/416
(58) Field of Classification Search ................ 370/414, 370/416, 417, 418, 412, 428, 429, 437, 447, 370/461, 462, 415
See application file for complete search history.

(56) References Cited

U.S. PATENT DOCUMENTS 6,667,984 B1 *  12/2003  Chao et al. ................ 370/414
7,006,514 B2 *   2/2006  Oki et al. .................. 370/415

* cited by examiner

*Primary Examiner*—Chi Pham
*Assistant Examiner*—Alexander O. Boakye
(74) *Attorney, Agent, or Firm*—Straub and Pokotylo; John C. Pokotylo

(57) ABSTRACT

An exhaustive service dual round-robin matching (EDRRM) arbitration process amortizes the cost of a match over multiple time slots. It achieves high throughput under non-uniform traffic. Its delay performance is not sensitive to traffic burstiness, switch size and packet length. Since cells belonging to the same packet are transferred to the output continuously, packet delay performance is improved and packet reassembly is simplified.

26 Claims, 12 Drawing Sheets

ARBITRATION USING DUAL ROUND ROBIN MATCHING WITH EXHAUSTIVE SERVICE OF WINNING VIRTUAL OUTPUT QUEUE

§ 1. PRIORITY CLAIMS

Benefit is claimed, under 35 U.S.C. § 119(e)(1), to the filing date of: provisional patent application Ser. No. 60/335,503, entitled "THE DUAL ROUND ROBIN MATCHING SWITCH WITH EXHAUSTIVE SERVICE", filed on Oct. 31, 2001 and listing Yihan Li, Shivendra S. Panwar, and Hung-Hsiang Jonathan Chao as the inventors; and provisional patent application Ser. No. 60/386,359, entitled "THE DUAL ROUND ROBIN MATCHING SWITCH WITH EXHAUSTIVE SERVICE", filed on Jun. 6, 2002 and listing Yihan Li, Shivendra S. Panwar, and Hung-Hsiang Jonathan Chao as the inventors, for any inventions disclosed in the manner provided by 35 U.S.C. § 112, ¶ 1. These provisional applications are expressly incorporated herein by reference.

§ 0. FEDERAL FUNDING

This invention was made with Government support and the Government may have certain rights in the invention as provided for by grant numbers ANI0081527 and ANI0081357 awarded by the National Science Foundation.

§ 2. BACKGROUND

§ 2.1 Field of the Invention

The present invention concerns the communication of data over networks, such as the Internet for example. More specifically, the present invention concerns scheduling the servicing (e.g., dispatching) of cells or packets buffered at input ports of a switch.

§ 2.2 Related Art

Switches and routers are used in networks, such as the Internet for example, to forward data towards its destination. The need for high-speed switches and routers is introduced in § 2.2.1 below. Then, input buffering, as used in high-speed switches, is introduced in § 2.2.2 below.

§ 2.2.1 The Need for Large-Scale and High-Speed (e.g., Terabit) Routers and Switches Many expect that Internet traffic will continue to grow explosively. Given this assumption, it is expected that high-speed switches and routers (e.g., those having a throughput over one Terabit per second) will become necessary. Most high-speed packet switches adopt a fixed-size cell in the switch fabric. If variable length packets are to be supported in the network, such packets may be segmented and/or padded into fixed-sized cells upon arrival, switched through the fabric of the switch, and reassembled into packets before departure. Input buffering is introduced below in § 2.2.2 as a way to handle these incoming cells.

§ 2.2.2 Buffering in High-Speed Routers and Switches

There are various types of buffering strategies in switch architectures: input buffering, output buffering, or crosspoint buffering. Information on these strategies can be found in the following articles: G. Nong and M. Hamdi, "On the Provision of Quality-of-Service Guarantees for Input Queued Switches," *IEEE Commun. Mag.*, Vol. 38, No. 12, pp. 62–69 (December 2000); E. Oki, N. Yamanaka, Y. Ohtomo, K. Okazaki, and R. Kawano, "A 10-Gb/s (1.25 Gb/s×8) 4×2 0.25-micrometer CMOS/SIMOX ATM Switch Based on Scalable Distribution Arbitration," *IEEE J. Solid-State Circuits*, Vol. 34, No. 12, pp. 1921–1934 (December 1999); and J. Turner and N. Yamanaka, "Architectural Choices in Large Scale ATM Switches," *IEICE Trans. Commun.*, Vol. E81-B, No. 2, pp. 120–137 (Feburary 1998). Each of these articles is incorporated herein by reference. Input buffering is a cost effective approach for high-speed switches. This is because input-buffered switches do not require internal speedup, nor do they allocate buffers at each crosspoint. They also relax memory-bandwidth and memory-size constraints.

§ 2.2.2.1 The Use of Virtual Output Queues to Avoid Head-of-Line Blocking

It is well known that head-of-line ("HOL") blocking limits the maximum throughput (e.g., to 58.6%) in an input-buffered switch with a First-In-First-Out (FIFO) structure. See, e.g., the article, M. J. Karol, M. G. Hluchyj, and S. P. Morgan, "Input Versus Output Queuing on a Space-Division Packet Switch," *IEEE Trans. Commun.*, Vol. COM-35, pp. 1347–1356 (1987). This article is incorporated herein by reference. The article, N. Mckeown, "The iSLIP Scheduling Algorithm for Input-Queued Switches," *IEEE/ACM Trans. Networking*, Vol. 7, No. 2, pp. 188–200 (April 1999), shows using a Virtual-Output-Queue (VOQ) structure to overcome HOL-blocking. This article is incorporated herein by reference.

In an input-buffered switch that uses VOQs, a fixed-size cell is sent from any input to any output, provided that, in a given time slot, no more than one cell is sent from the same input, and no more than one cell is received by the same output. Each input port has N VOQs, one for each of N output ports. The HOL cell in each VOQ can be selected for transmission across the switch in each time slot. Therefore, every time slot, a scheduler has to determine one set of matching. That is, for each of the output ports, the scheduler may match one of the corresponding VOQs with the output port.

§ 2.2.2.2 Maximum-Sized and Maximal-Sized Matching Algorithms in High Speed Switches Maximum-sized matching algorithms to schedule the input-output matching for input-buffered switches with VOQS, that achieve 100% throughput have been proposed. See, e.g., the articles: J. E. Hopcroft and R. M. Karp, "An Algorithm for Maximum Matching in Bipartite Graphs," *Soc. Ind. Appl. Math J. Computation*, Vol. 2, pp. 225–231 (1973); and N. Mckeon, A. Mekkittikul, V. Anantharam, and J. Walrand, "Achieving 100% Throughput in Input-Queued Switches," *IEEE Trans. Commun.*, Vol. 47, No. 8, pp. 1260–1267 (August 1999). These articles are incorporated herein by reference. Unfortunately, these algorithms are hard to implement in high-speed switches because of their high computing time complexity.

Maximal-sized matching algorithms have been proposed as an alternative to the maximum-sized matching ones. Two of these algorithms, iSLIP and Dual Round-Robin Matching (DRRM), are described in the articles: N. Mckeown, "The iSLIP Scheduling Algorithm for Input-Queued Switches," *IEEE/ACM Trans. Networking*, Vol. 7, No. 2, pp. 188–200 (April 1999); H. J. Chao and J. S. Park, "Centralized Contention Resolution Schemes for a Large-Capacity Optical ATM Switch," *Proc. IEEE ATM Workshop '97*, Fairfax, Va. (May 1998); and H. J. Chao, "Saturn: A Terabit Packet Switch Using Dual Round-Robin," *IEEE Commun. Mag.*, Vol. 38, No. 12, pp. 78–84 (December 2000). These articles are incorporated herein by reference. The computing complexity of the iSLIP and DRRM methods are less than maximum matching methods. Moreover, the iSLIP and DRRM methods provide 100% throughput under uniform traffic and complete fairness for best-effort traffic.

§ 2.2.2.2.1 DRRM and its Performance

A dual round-robin matching arbitration process is described in U.S. patent application Ser. No. 09/312.320, entitled "METHODS AND APPARATUS FOR ARBITRATING OUTPUT PORT CONTENTION IN A SWITCH HAVING VIRTUAL OUTPUT QUEUING", filed on May 14, 1999 and listing Hung-Hsiang Jonathan Chao and Jin-Soo Park as inventors. This patent application is incorporated herein by reference. In an exemplary embodiment of the DRRM scheme, each input port maintains N VOQs. The DRRM process has two steps—a request step and a grant step. In the request step, each input sends an output request corresponding to the first nonempty VOQ in a fixed round-robin order, staring from the current position of the pointer. The pointer remains at that nonempty VOQ if the selected output is not granted in the grant step (described below). The pointer of the input arbiter is incremented by one location beyond the selected output if, and only if, the request is granted in the grant step.

In the grant step, if an output receives one or more requests, it chooses the one that appears next in a fixed round-robin schedule starting from the current position of the pointer. The output notifies each requesting input whether or not its request was granted. The pointer of the output arbiter is incremented to one location beyond the granted input. If there are no requests, the pointer remains where it is.

The performance of the DRRM scheme has been shown and compared with that of ISLIP in the article, Y. Li, S. Panwar, H. J. Chao, "On the performance of a Dual Round-Robin switch," *IEEEINFOCOM* 2001, vol 3, pp. 1688–1697, April 2001. Under uniform and i.i.d. traffic the throughput of a DRRM switch is 100%, and the average cell delay increases with switch size for a given load. The performance under nonuniform traffic is also considered in the article, Y. Li, S. Panwar, H. J. Chao, "On the performance of a Dual Round-Robin switch," *IEEEINFOCOM* 2001, vol 3, pp. 1688–1697, April 2001. Simulation results show that under the hot-spot traffic, throughput for the hot-spot output of a DRRM switch is 100%. However, for nonuniform traffic scenarios, simulations show that the throughput of both DRRM and iSLIP drops below 100%.

§ 2.2.3 Average Packet Delay

Most of the previous work only considers the cell delay that a cell suffers from the time it enters a VOQ to the time it is transferred to the destination output port. Additional delay incurred at the Output Reassembly Module ("ORM") of each output to reassemble packets (See the article, M. Am Marsan, A. Bianco, P. Giaaccone, E. Leonardi, F. Neri, "Packet Scheduling in Input-Queued Cell-Based Switches," *IEEEINFOCOM* 2001, vol. 2 PP. 1085–1094, April, 2001.). Multiple queues are needed at each ORM if cells belonging to different packets are interleaved at the same output. When a cell is transferred through the switch fabric to the output, it is delivered to one of the queues of the ORM. The cells belonging to the same packet will be delivered to the same queue and can only leave the queue until the whole packet is reassembled. The total delay a packet suffers includes the cell delay and the time needed for reassembly. Thus the cell delay is not enough to evaluate the variable component of the delay incurred in a packet switch.

Since real world traffic may often be non-uniform, a better arbitration technique is needed. Such an arbitration technique should not be too complex and should perform reasonably well for various traffic scenarios. Further, such an arbitration technique should have an acceptable average packet delay.

§ 3. SUMMARY OF THE INVENTION

The present invention may be used to provide an arbitration process, and an arbiter, that perform well under non-uniform traffic conditions, and that perform reasonably well under other traffic scenarios as well. The present invention may do so by modifying the DRRM scheme so that whenever an input is matched to an output, all the cells in the corresponding VOQ will be transferred in the following time slots (i.e., the VOQ is "exhausted") before any other VOQ of the same input can be served.

The present invention updates the pointers of inputs and outputs are updated in a different way from DRRM. In a time slot, if an input is matched to an output, one cell in the corresponding VOQ will be transferred. After that, if the VOQ becomes empty, the input will update its arbiter pointer to the next non-empty location in a fixed order; otherwise, the pointer will remain at the current VOQ so that a request will be sent to the same output in the next time slot.

In one embodiment of the present invention, if an input sends a request to an output but gets no grant, the input will update its arbiter pointer to the next non-empty location in a fixed order, which is different from DRRM where the input pointer will remain where it is until it gets a grant. The pointers may be updated in this way because if an input cannot get a grant from an output, it means that the output is most likely in a "stable marriage" with another input for all the cells waiting in the VOQ, and the unsuccessful input is likely to wait for a long time to get a grant from this output. It is better for the input to search for another free output than to wait for this busy one. In an alternative embodiment, the input pointer can remain where it is until it gets a grant.

Since an output has no idea if the currently served VOQ will become empty after this service, in one embodiment of the present invention, outputs will not update their arbiter pointers after cell transfer.

§ 4. BRIEF DESCRIPTION OF THE DRAWINGS

Figure 4A:
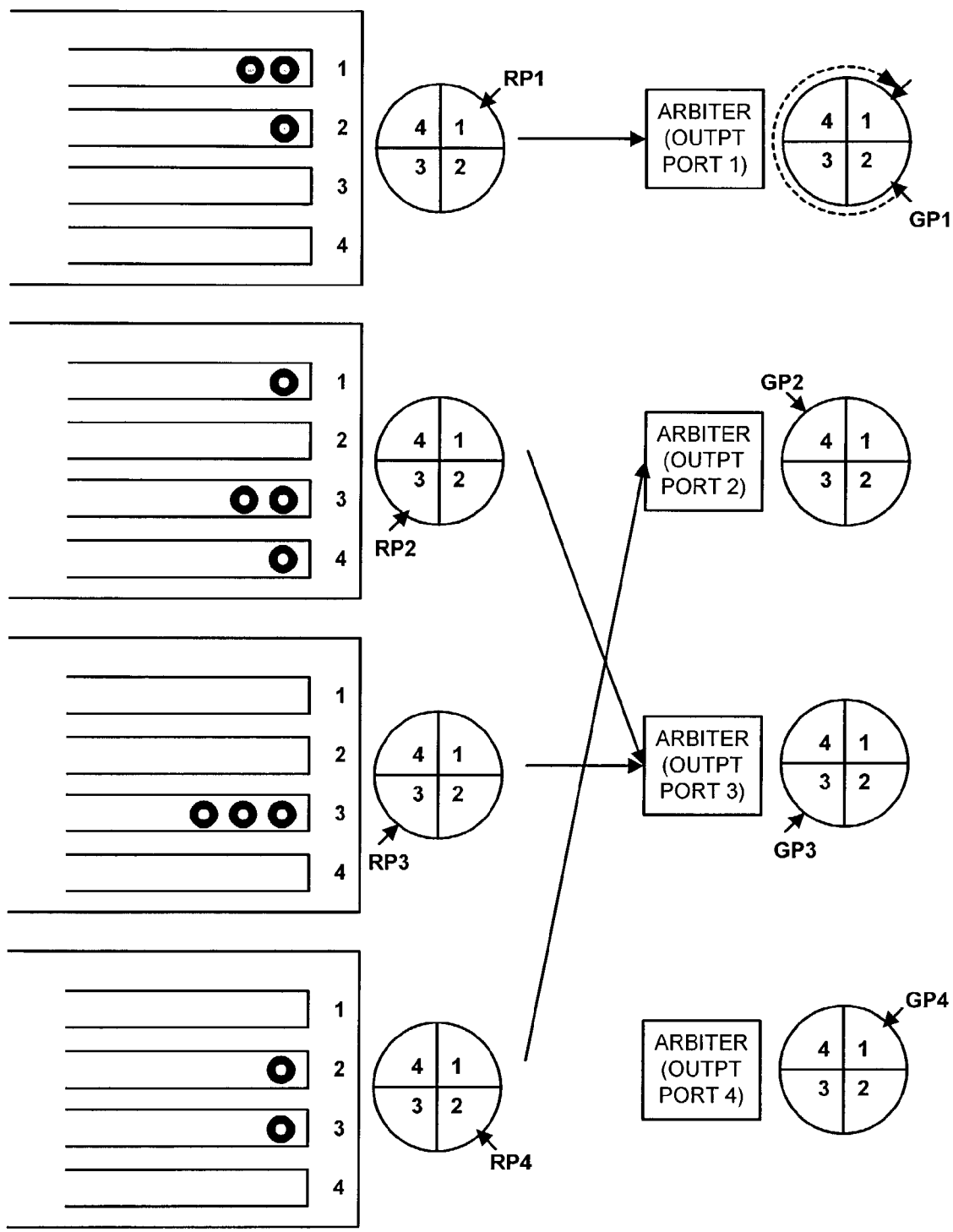
Figure 4B:
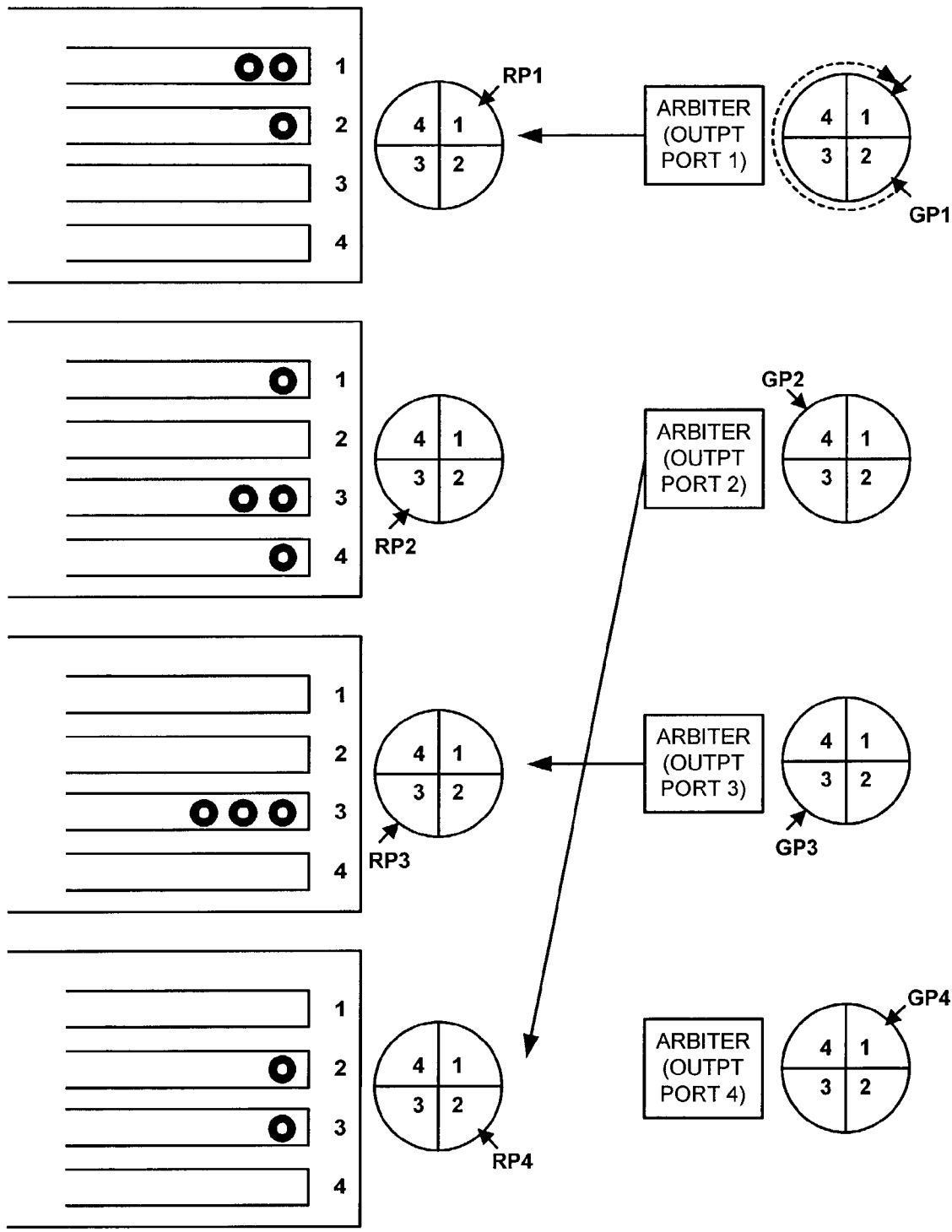
Figure 4C:
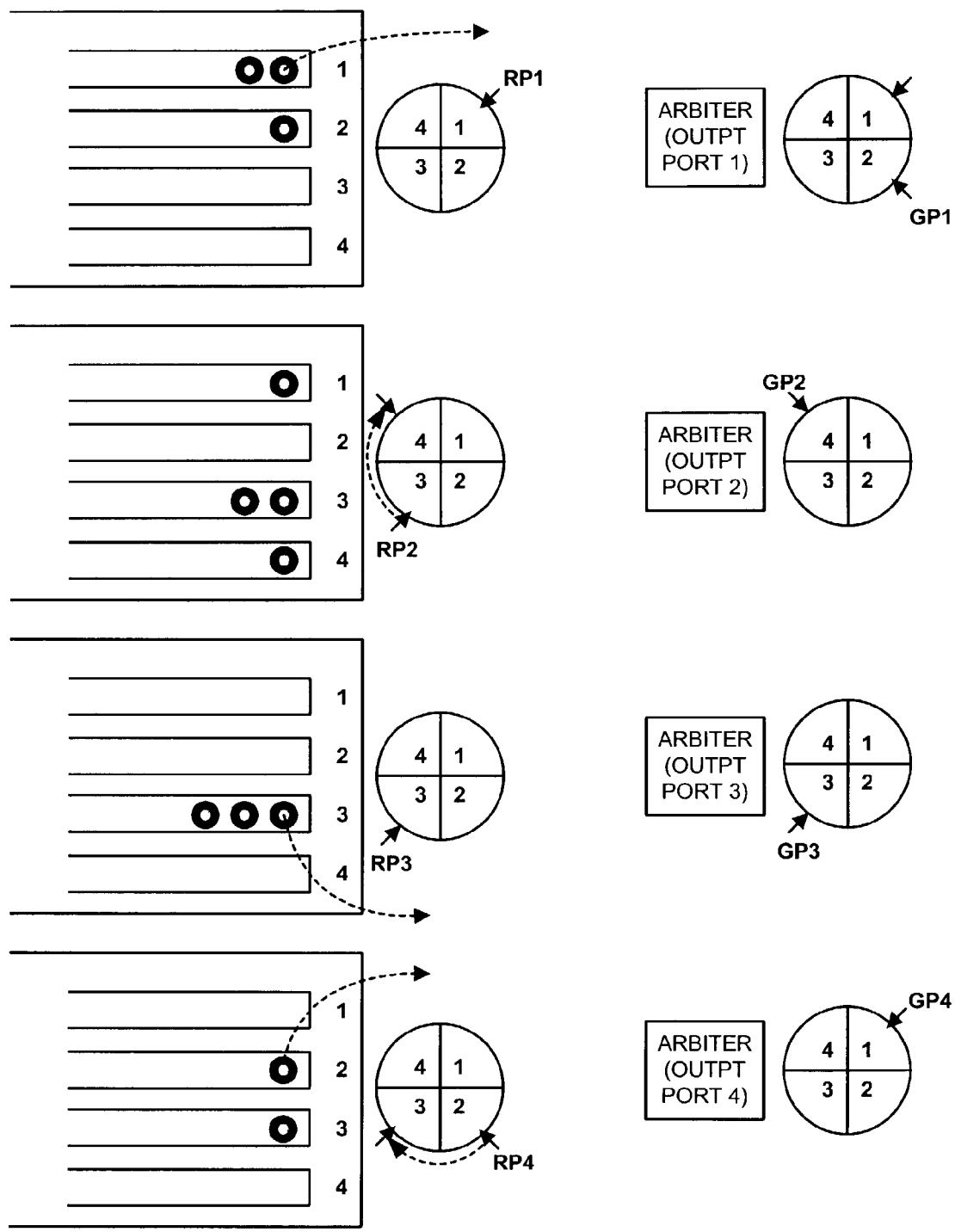

FIGS. 4A–4C provide an example that illustrates an operation of an exemplary arbitration process that operates in a manner consistent with the principles of the present invention.

FIGS. 5–11 illustrate various characteristics and properties of one embodiment of the arbitration process of the present invention.

Figure 12:
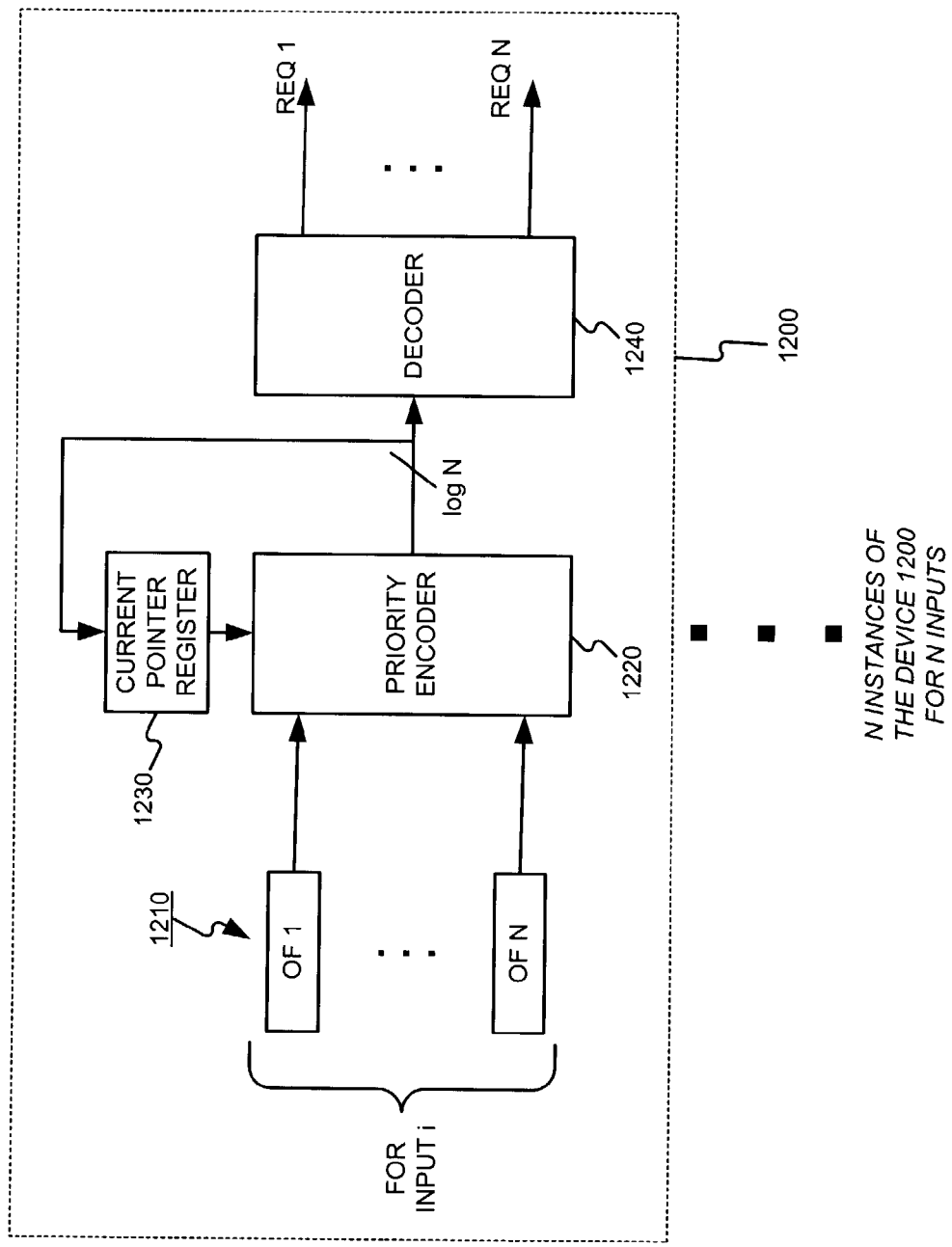

FIG. 12 is a block diagram illustrating an exemplary request generation and control device that may be used as a part of an arbitration process consistent with the principles of the present invention.

Figure 13:
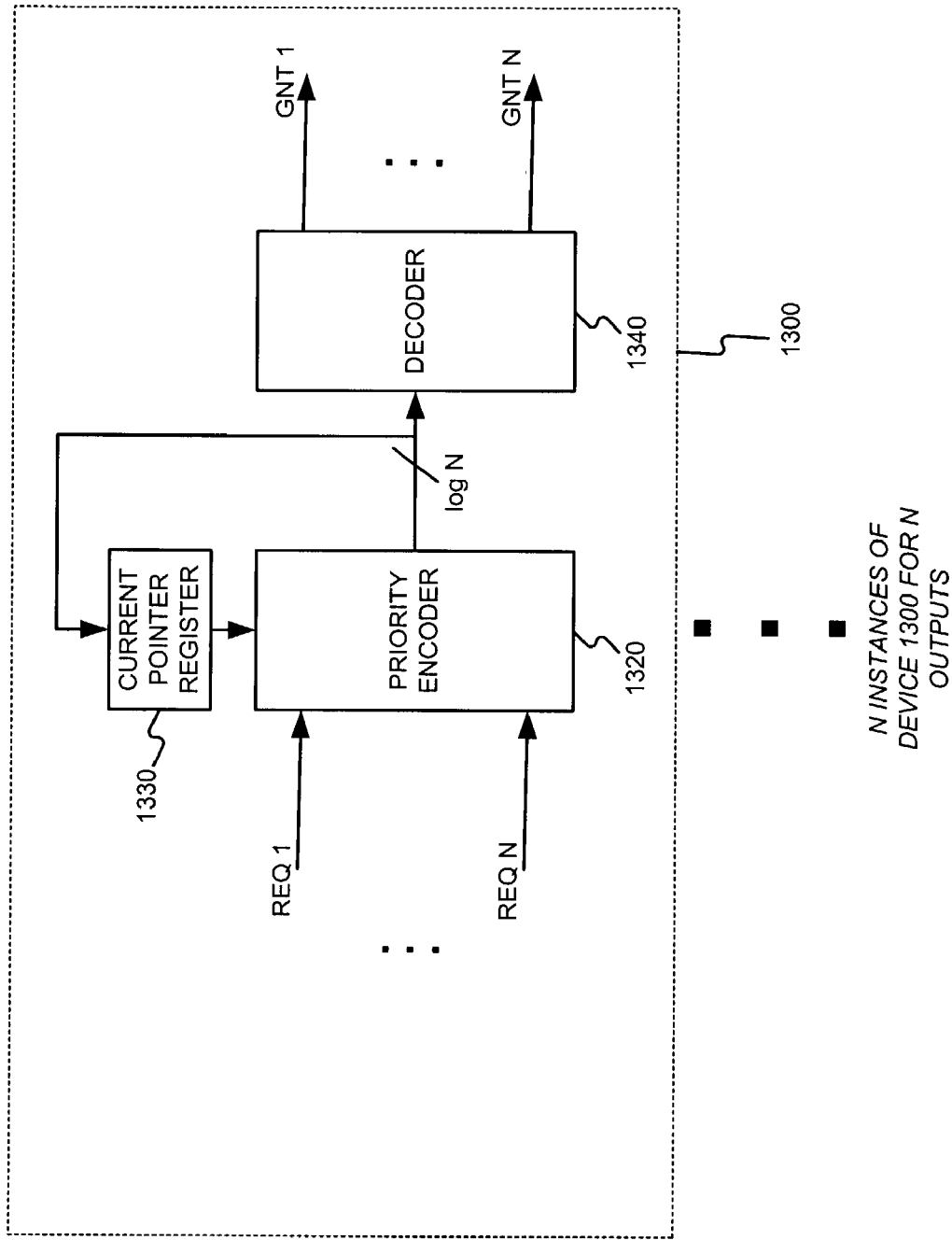

FIG. 13 is a block diagram illustrating an exemplary grant generation and control device that may be used as a part of an arbitration process consistent with the principles of the present invention.

§ 5. DETAILED DESCRIPTION OF THE INVENTION

The present invention involves methods, and apparatus for arbitrating output port contention by cells or packets in an (high-speed) input buffered switch. The following description is presented to enable one skilled in the art to make and use the invention, and is provided in the context of particular embodiments and methods. Various modifications to the disclosed embodiments and methods will be apparent to those skilled in the art, and the general principles set forth below may be applied to other embodiments, methods and applications. Thus, the present invention is not intended to be limited to the embodiments and methods shown and the inventors regard their invention as the following disclosed methods, apparatus and materials and any other patentable subject matter to the extent that they are patentable.

§ 5.1 Exemplary Environment

Figure 1:
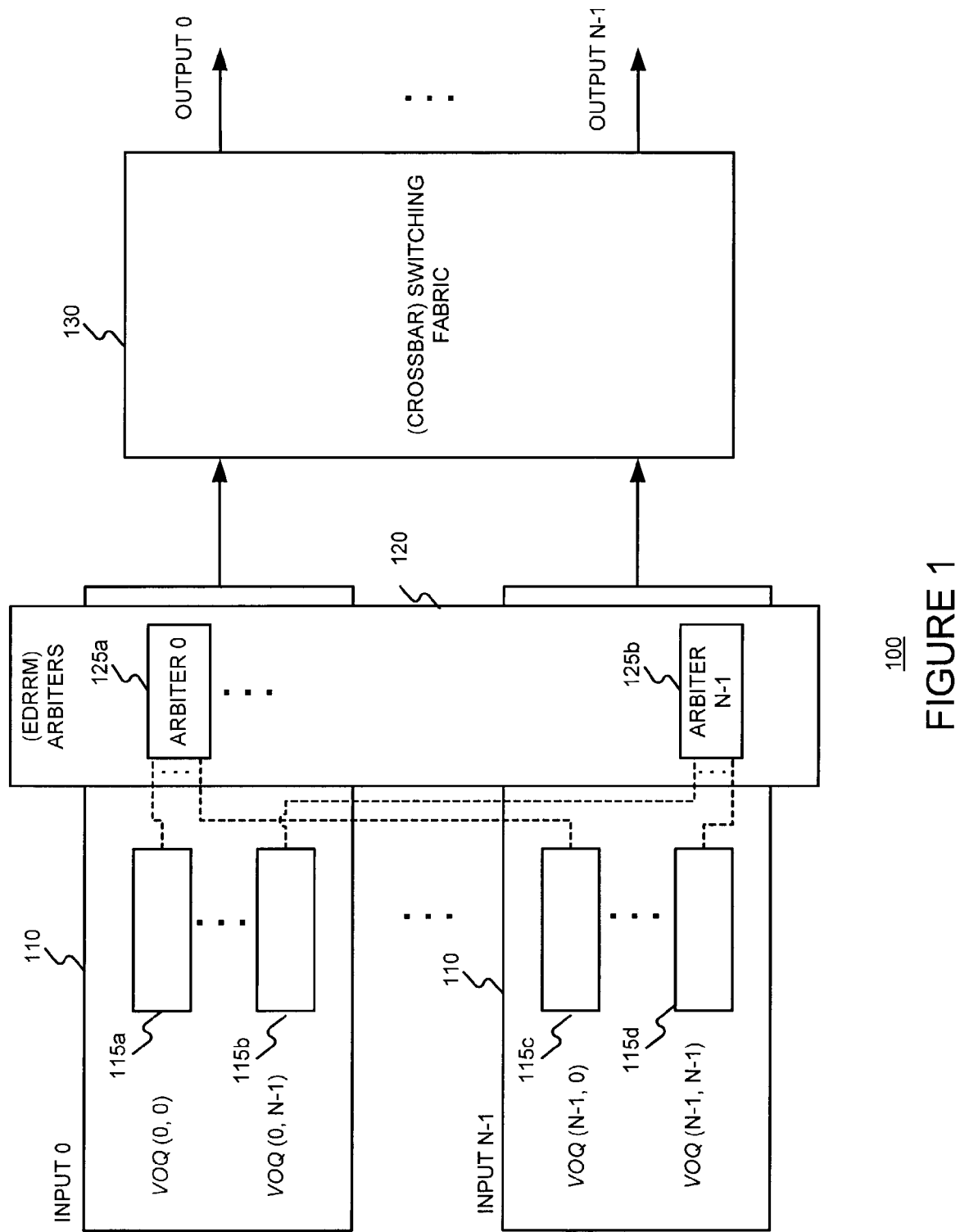
FIG. 1 is a block diagram of an exemplary input buffered switch with which the present invention may be used.

The present invention may be used with an input-buffered switch with virtual output queues (VOQs). For example, as shown in FIG. 1, the switch 100 may include input (ports) 110, a collection of arbiters (one for each output port) 120 and (e.g., crossbar) switching fabric 130. As shown in FIG. 1, there may be N inputs. In one embodiment, these N inputs may be grouped across m input modules (not shown). Each input 110 will preferably have a number of VOQs 115 corresponding to the number of outputs. Thus, if there are N outputs, each input 110 will have N VOQs 115.

§ 5.2 Functions That May be Performed

A first aspect of the present invention may function to arbitrate buffered cells contending for the same output port, in a way that offers high throughput even under non-uniform traffic conditions.

§ 5.3 Exemplary Operations

Still referring to FIG. 1, each input port 110 may have an associated request generation and control operation. For example, when a new cell arrives at the switch, a VOQ operation may place the cell in the appropriate VOQ 115. The VOQ operation may also inform a request generation and control operation associated with its input port 110 about the stored cell. Accordingly, in a switching having N input ports 110, N output ports, and $N^2$ VOQs 115, N request generation and control operations—one for each input port and N VOQs—may be provided.

In (e.g., at the beginning of) each cell time slot, the request generation and control operation may determine whether its pointer points to a VOQ with a cell. If not, the request generation and control operation may determine a next VOQ with a cell (referred to as a "next non-empty VOQ"). Each request generation and control operation may then submit a request to an arbiter 125 associated with the output port corresponding to the determined VOQ.

Each of N grant generation and control operation accepts requests, if any. In each case, it then determines whether or not its pointer points to an input port associated with a received request. If not, the grant generation and control operation may determine a next input port associated with a received request. It may then send a grant back to the determined input port, if any. If an input port receives a grant, the VOQ associated with the request just sent by that input port transmits its head of line cell.

Pointers used by the request generation and control operation and the grant generation and control operation are managed such that once a particular VOQ wins contention (i.e., receives a grant), it will continue to transmit head of line cells in subsequent consecutive cell time slots until that VOQ is empty. Thus, the winning VOQ is exhausted—its cell contents are emptied. In an alternative embodiment, once a VOQ wins contention (i.e., receives a grant), it will continue to transmit head of line cells in a sequence of cell time slots until a predetermined threshold number of consecutive cells from the VOQ have been transmitted. This reduces the likelihood of unfairness.

Having described various operations that may be performed in accordance with the present invention, exemplary apparatus, methods and data structures for implementing such operations are now described in § 5.4 below.

§ 5.4 Exemplary Methods and Apparatus For Performing the Exemplary Operations

Exemplary methods that may be used to implement various operations of the present invention are described in § 4.4.1. Then, exemplary apparatus that may be used to implement various operations of the present invention are described in § 4.4.2.

§ 5.4.1 Exemplary Methods

In the DRRM scheme described in § 2.2.2.2.1 above, when an input and an output are matched, only one cell is transferred from the input to the matched output. After that both the input and the output will increment their pointers by one and in the next time slot and this input-output pair will have the lowest matching priority. In order to improve on DRRM's performance under non-uniform traffic, the present invention modified the DRRM scheme so that whenever an input is matched to an output, all the cells (or large predetermined number of cells) in the corresponding VOQ will be transferred in subsequent consecutive time slots (i.e., the VOQ is "exhausted") before any other VOQ of the same input can be served.

In the arbitration process of the present invention, the pointers of inputs and outputs are updated in a different way from DRRM. In a time slot if an input is matched to an output, one cell in the corresponding VOQ will be transferred. After that, if the VOQ becomes empty, the input will update its arbiter pointer to the next (non-empty) VOQ in a fixed order; otherwise, the pointer will remain at the current VOQ so that a request will be sent to the same output in the next time slot. In one embodiment, if an input sends a request to an output but gets no grant, the input will update its arbiter pointer to the next (non-empty) VOQ in a fixed order, which is different from DRRM where the input pointer will remain where it is until it gets a grant. The reason for this modification is as follows. With the arbitration process of the present invention, if an input cannot get a grant from an output, it means that the output is most likely in a "stable marriage" with another input for all the cells waiting in the VOQ of the matched input, and the unsuccessful input is likely to wait for a long time to get a grant from this output. It is better for the input to search for another free output than to wait for this busy one. In an alternative embodiment, the input pointer can remain where it is until it gets a grant.

Since an output has no idea if the currently served VOQ will become empty after this service, outputs will not update their arbiter pointers after cell transfer.

Figure 2:
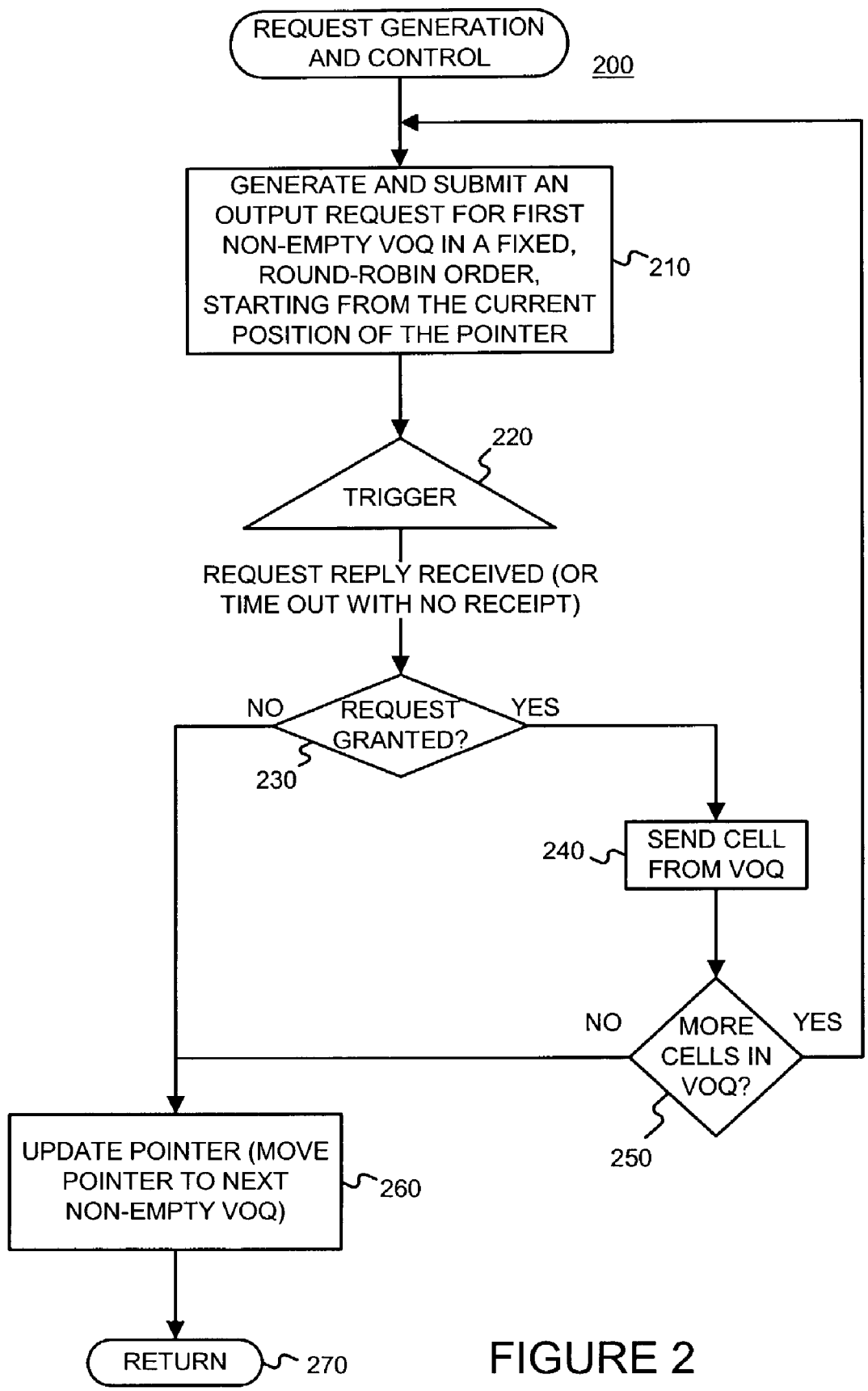
FIG. 2 is a flow diagram illustrating an exemplary request generation and control method that may be used as a part of an arbitration process consistent with the principles of the present invention.

A detailed description of an exemplary two step EDRRM process is provided below with reference to FIGS. 2 and 3. FIG. 2 is a flow diagram illustrating an exemplary request generation and control method 200 that may be used as a part of an arbitration process consistent with the principles of the present invention. Note that individual instances of this method 200 are performed for each input port.

The method uses a pointer which moves through an entry for each VOQ in a round-robin (or equivalent) order. An output port request is generated and submitted for a first non-empty VOQ in a fixed, round-robin (or equivalent) order staring from the current position of the pointer (block 210). As indicated by trigger (event) block 220 when a request reply is received (or not received within a time out period in which case it can be inferred that the request was not granted), it is determined whether or not the request was granted (decision block 230). If the request was not granted, in one embodiment, the pointer is updated (e.g., moved to the next non-empty VOQ) (block 260) before the method is left via RETURN node 270. This embodiment uses the "stable marriage" assumption discussed above. Referring back to decision block 230, if the request was granted, it sends its head of line cell from the VOQ (block 240) and determines whether there are any more cells in the VOQ that just won arbitration (block 250). If not, the pointer is updated (e.g., moved to the next non-empty VOQ) (block 260) before the method 200 is left via RETURN node 270. If, on the other hand, there are more cells in the VOQ that just won arbitration, the method 200 branches back to block 210. In this way, once a VOQ wins arbitration, it will try to exhaust its stored cells.

As can be appreciated from the foregoing, the method 200 effects a request step. Each input moves its pointer to the first nonempty VOQ in a fixed round-robin order, starting from the current position of the pointer, and sends a request to the output corresponding to the VOQ. The pointer of the input arbiter is incremented by one location beyond the selected output if the request is not granted in a grant step (described below), or if the request is granted and after one cell is served this VOQ becomes empty. Otherwise, the pointer remains at that (nonempty) VOQ.

Figure 3:
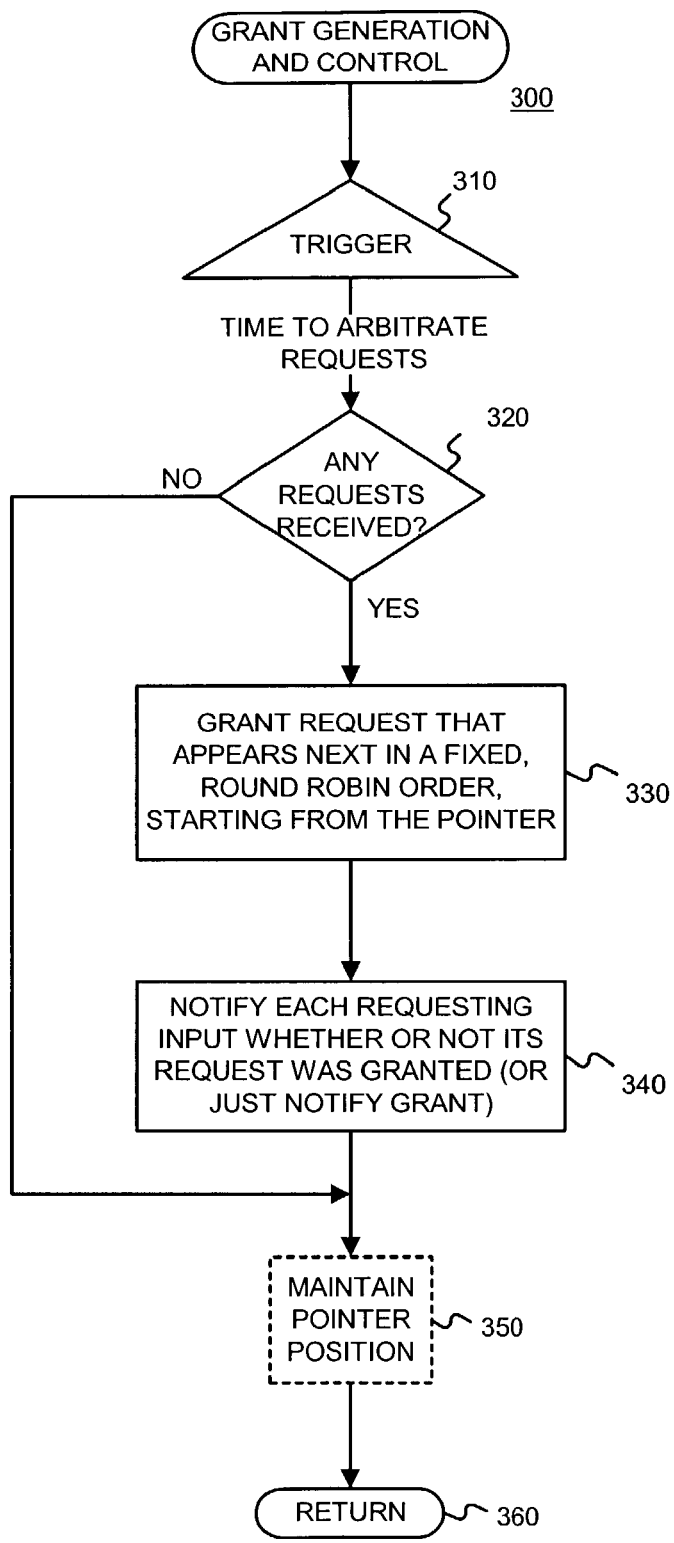
FIG. 3 is a flow diagram illustrating an exemplary grant generation and control method that may be used as a part of an arbitration process consistent with the principles of the present invention.

FIG. 3 is a flow diagram illustrating an exemplary grant generation and control method 300 that may be used as a part of an arbitration process consistent with the principles of the present invention. Note that individual instances of this method 300 are performed for each output port.

The method uses a pointer which moves through an entry for each input port in a round-robin (or equivalent) order. When it is time to arbitrate requests (trigger block 310), the method 200 determines whether any requests have been received (decision block 320). If no requests have been received, the method 300 is left via RETURN node 360. Accordingly, the pointer position is maintained (as noted by block 350, which is depicted in phantom since it is not really an act). If, on the other hand, one or more requests have been received, the method 300 grants the request that appears next in a fixed, round-robin (or equivalent) order, starting with the pointer (block 330). Then, each input that submitted a request is notified of whether or not its request was granted (block 340). Alternatively, only the input that submitted a request that was granted is notified. The other inputs, if any, can infer that their requests were not granted. The method 300 is then left via RETURN node 360. Accordingly, the pointer position is maintained (as noted by block 350, which is depicted in phantom since it is not really an act). This permits a winning VOQ the opportunity to exhaust all of its cells. Note that if winning VOQ only had one cell, and will therefore be empty in the next cell time slot, it will not submit a request and the outputs pointer will advance (per block 330) in that next cell time slot.

As can be appreciated from the foregoing, the method 300 effects a grant step. If an output receives one or more requests, it chooses the one that appears next in a fixed round-robin schedule starting from the current position of the pointer. The pointer is moved to this position. The output notifies each requesting input whether or not its request was granted. The pointer of the output arbiter remains at the granted input. If there are no requests, the pointer remains where it is.

§ 5.4.2 Exemplary Apparatus

FIG. 12 is a block diagram illustrating an exemplary request generation and control device that may be used as a part of an arbitration process consistent with the principles of the present invention. N instances of the (input arbiter) device 1200 are provided for the N inputs. An occupancy flag 1210 is provided for each of the N VOQs of the input port. A priority encoder 1220, a current pointer register 1230 and a decoder 1240 are arranged to generate one of N requests for one of the N outputs, in a manner consistent with the principles of the present invention.

FIG. 13 is a block diagram illustrating an exemplary grant generation and control device that may be used as a part of an arbitration process consistent with the principles of the present invention. N instances of the (output arbiter) device 1300 are provided for the N outputs. Requests can be provided from each of the N input ports. A priority encoder 1320, a current pointer register 1330 and a decoder 1340 are arranged to generate a grant for one of the N inputs, in a manner consistent with the principles of the present invention.

In one embodiment, the implementation complexity of EDRRM's switching fabric is identical to that of DRRM. Since the operational step and data exchange is limited, the DRRM arbitration mechanism can be implemented in a distributed manner to make the switch simpler and more scalable. The length of each control message in DRRM is only $\frac{1}{N}$ th of that in iSLIP. In the article, H. J. Chao, "Saturn: a terabit packet switch using Dual Round-Robin", *IEEE Communication magazine*, vol. 38 12, pp. 78–84, December 2000, it is shown that by using a token-tunneling technique a switch capacity of more than one terabit/sec is achievable with existing electronic technology. The ORM of EDRRM is simpler than that of DRRM. Only one queue, with a buffer size equal to the maximum packet size, is maintained in the ORM of an EDRRM switch since cells belonging to the same packet are served sequentially from a VOQ. Usually, as in DRRM and iSLIP, since cells of different packets are interleaved, N queues are needed in each ORM, one for each input. In the next section, we will show that EDRRM has performance comparable with DRRM and iSLIP under uniform independent traffic, and has better performance under bursty traffic and nonuniform traffic.

§ 5.5 Examples Illustrating Operations Performed by and Exemplary Embodiment

FIGS. 4A–4C illustrate an example of operations of an EDRRM scheduling method in accordance with one embodiment of the invention. Request pointers RP1, RP2, RP3 and RP4 are arbiter pointers for inputs 1, 2, 3 and 4, respective, and grant pointers GP1, GP2, GP3 and GP4 are arbiter pointers for outputs 1, 2, 3 and 4, respectively.

As illustrated in FIG. 4A, at the beginning of the time slot RP1 points to output 1 while GP1 does not point to input 1. This indicates that in the last time slot, input 1 was not matched to output 1, but now input 1 requests output 1 for a new service. Similarly, RP2 requests output 3 for a new service. Since RP2 points to output 3 and GP3 points to input 3, it is possible that in the last time slot input 3 was matched to output 3 and in this time slot output 3 will transfer the next cell from input 3 because the VOQ is not empty. Input 4 and output 2 have a similar situation as input 3 and output 3.

As shown in FIG. 4B, in the grant phase, output 1 grants the only request it received (i.e., the request from input 1) and updates GP1 to 1. Output 2 grants the request from input 4 and leaves its GP2 at input 4. Output 3 grants the request from input 3 and leaves its GP3 at input 3.

As shown in FIG. 4C, since the request from input 2 to output 3 was not granted, RP2 moves from 3 to 4. By the end of this time slot, the $1^{st}$ VOQ of input 1 and the $3^{rd}$ VOQ of input 3 are still nonempty. Accordingly, RP1 and RP2 are not updated. The pointer RP4 is updated from 2 to 3 because the $2^{nd}$ VOQ of input 4 becomes empty.

§ 5.6 Characteristics and Properties of EDRRM

In this section simulation results comparing the throughput and delay performance of one embodiment of the arbitration process or the present invention (referred to as "EDRRM") with that of DRRM and iSLIP are summarized.

A. Throughput

Figure 5:
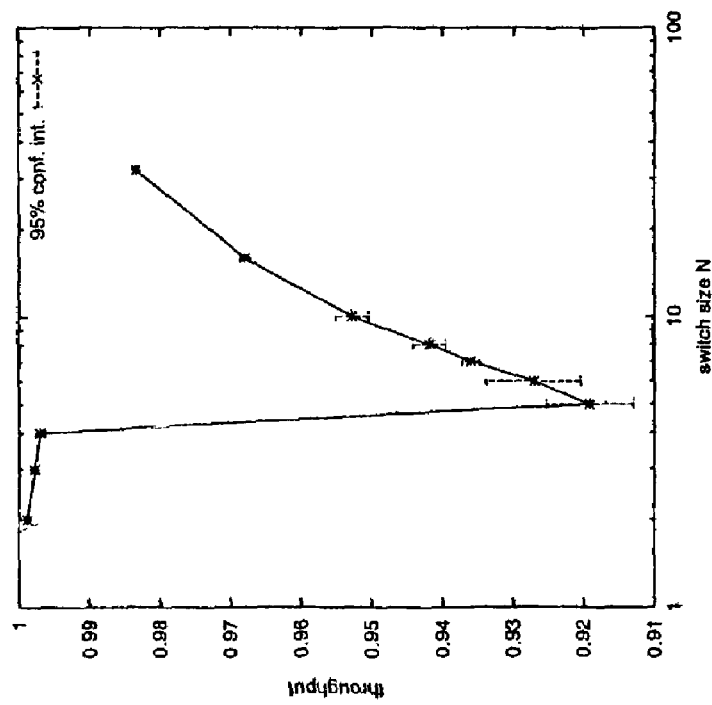

DRRM was proven to have 100% throughput under uniform and i.i.d. traffic in the article, Y. Li, S. Panwar, H. J. Chao, "On the performance of a Dual Round-Robin switch," *IEEEINFOCOM* 2001, vol 3, pp. 1688–1697, April 2001. According to simulation results the throughput of EDRRM under uniform and i.i.d. traffic is close to, but not quite 100%. FIG. 5 shows the throughput of EDRRM with different switch size under uniform and i.i.d. traffic with 100% arrival rate. Note that the throughput first gdecreased and then increases with switch size. The inventors believe that for larger N the throughput will approach 100% asymptotically. This belief is further supported by the analysis in the reference, Y. Li, S. Panwar, H. J. Chao, "Performance analysis of an Exhaustive Service Dual Round-Robin scheduling algorithm,: *CATT Technical Report*, November 2001. In any event, the throughput of EDRRM under uniform traffic never drops below 91%.

In the following, four nonuniform traffic patterns are used to compare the throughput of EDRRM to those of DRRM and iSLIP. Each of these traffic patterns is described below.

Pattern 1: Hot-spot traffic, which refers to a traffic pattern where many inputs send traffic to one output line (the hot-spot) at the same time, thus overloading it. The hot-spot throughput of EDRRM is 100%, which is the same as that of DRRM and higher than that of iSLIP according to the results in the article, Y. Li, S. Panwar, H. J. Chao, "On the performance of a Dual Round-Robin switch," *IEEEINFOCOM* 2001, vol 3, pp. 1688–1697, April 2001.

Pattern 2: In this pattern the arrival rates for all inputs are identical and equal to the loading of all outputs. For input i a fraction p, $1/N \leq p < 1$ of arrivals are destined to output i, and other arrivals are uniformly destined to other outputs. When $p=1/N$, this corresponds to the uniform case. When $p=1$, all the arriving cells of input i are destined to output i.

Figure 6:
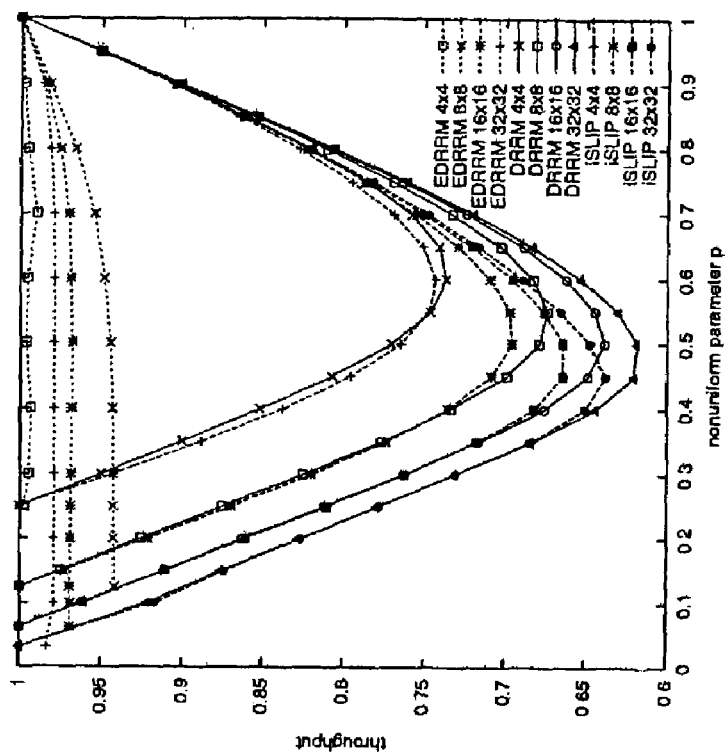

FIG. 6 compares the throughput of EDRRM, DRRM and iSLIP under this traffic pattern for different switch sizes. It shows that EDRRM has higher throughput than DRRM. The figure also shows that for the EDRRM switch, the throughput under uniform arrivals (when $p=1/N$) is comparable to the throughput under nonuniform arrivals (when $p>1/N$) In a DRRM switch each VOQ gets uniform service. On the other hand, in an EDRRM switch all the cells in a VOQ will be served when the VOQ obtains service no matter what the arrival rate is for this VOQ. When the system is stable, the service rate for a VOQ is close to the arrival rate, which leads to a high throughput. Note that another attractive feature of EDRRM is that it automatically adapts to changes in traffic flow through the switch. That is, no parameter has to be set to optimize performance for a given non-uniform traffic flow. This is important since it simplifies switch traffic management as traffic flows change with time. Also note that, as in FIG. 6, the overall throughput first drops with switch size N and then increases with N. Note that with increasing switch size, the EDRRM switch can maintain close to 100% throughput for this nonuniform traffic pattern. Simulation results also show that the average cell delay of VOQs with heavy load is lower than that of VOQs with light load.

Pattern 3: In this pattern the arrival rate for each input is the same. For input i a fraction f of arrivals are destined to output i, and other arrivals are destined to output (i+1) modN. Table I compares the throughput of EDRRM, DRRM and iSLIP under this traffic pattern for different f with switch size 4. EDRRM has a higher throughput then DRRM or iSLIP. For f close to 0.5, the throughputs of DRRM and iSLIP are around 0.75. The reason is that both DRRM and iSLIP may be trapped in a bad state as shown in the article, C-S Chang, D. Lee and Y Jou, "Load balanced Birkhoff-von Nuemann switches, part I: one-stage buffering," special issue of *Computer Communications on "Current Issues in Terabit Switching,"* 2001. This did not happen to EDRRM in simulations.

TABLE 1

| f | 0.1 | 0.2 | 0.3 | 0.4 |
|---|---|---|---|---|
| EDRRM | 0.969 | 0.949 | 0.931 | 0.872 |
| DRRM | 0.912 | 0.854 | 0.840 | 0.750 |
| iSLIP | 0.909 | 0.840 | 0.810 | 0.750 |

Pattern 4: In this pattern the arrival rate for each input is the same. From input i the traffic load to output (i+j)modN is two times the load to output (i+j+1)modN, $0 \leq j \leq N-2$. Table II compares the throughput of EDRRM, DRRM and iSLIP under this traffic pattern for different switch sizes. The throughput of EDRRM is always above 90%, which is much higher than the throughputs of DRRM and iSLIP.

TABLE 2

| size | 4 | 8 | 16 | 32 |
|---|---|---|---|---|
| EDRRM | 0.941 | 0.922 | 0.915 | 0.917 |
| DRRM | 0.756 | 0.722 | 0.720 | 0.720 |
| iSLIP | 0.745 | 0.720 | 0.719 | 0.719 |

In traffic pattern 1, unfairness may occur for an EDRRM switch when one input occupies the hot-spot output for a long period and cells from other inputs destined to the hot-spot output cannot get through. To avoid unfairness, a limit on the maximum number of cells or packets that can be served continuously in a VOQ can be enforced by means of a counter. According to simulation results, with a VOQ cell service limit of 1000 cells, approximately $1/N$ th of cells served by the hot-spot output come from each input. The performance of an EDRRM switch with a VOQ cell service limit does not differ much from the performance of EDRRM with no VOQ cell service limit for other patterns. Therefore, the simulation results of this variation are not provided. The variation can also help to balance the average delay between heavily loaded VOQs and lightly loaded VOQs in some level.

B. Average Cell Delay

Since the performance of iSLIP and DRRM are roughly comparable (See the article, Y. Li, S. Panwar, H. J. Chao, "On the performance of a Dual Robin-Robin switch," *IEEE-INFOCOM* 2001, vol 3, pp. 1688–1697, April 2001.), the performance of EDRRM is compared with DRRM from this point onward for purposes of clarity.

Figure 7:
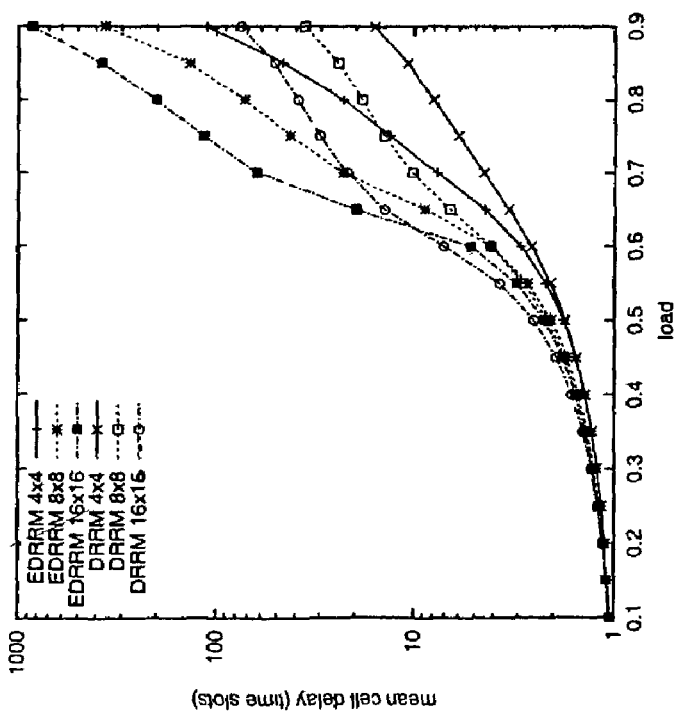

FIG. 7 shows the average cell delay of EDRRM and DRRM under uniform and i.i.d. traffic with different switch sizes. The average cell delay of an EDRRM switch under uniform traffic and a heavy load is acceptable, though larger than that of a DRRM switch.

Figure 8:
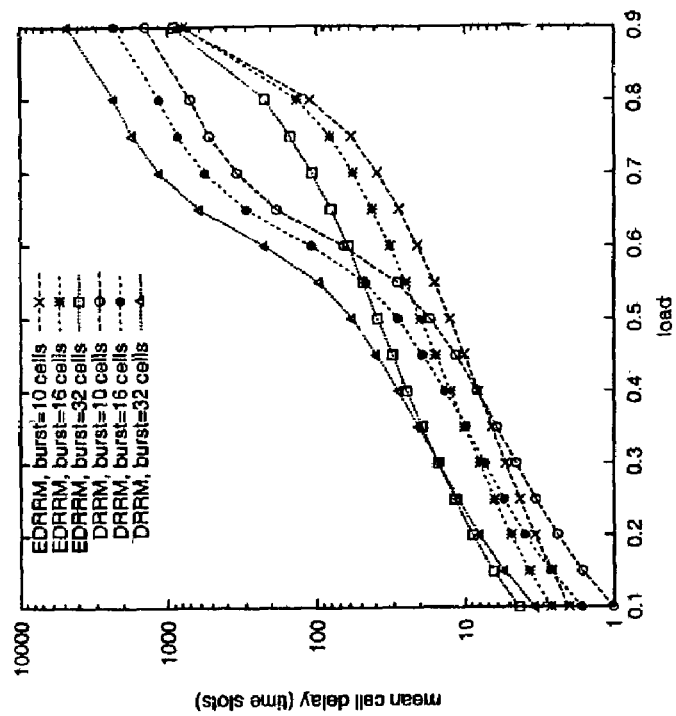

FIG. 8 compares the average cell delay of an EDRRM switch and a DRRM switch with switch size of 16×16 under uniform and geometrically distributed bursty traffic with different average burst lengths. It shows that with the same average burst length, the average delay of DRRM is much larger than that of EDRRM under heavy load. The average delay of a DRRM switch increases approximately linearly with burst length, which is similar to the behavior of an EDRRM switch under light load. Significantly, under heavy load the average delay of an EDRRM switch does not change much with different average burst lengths and is much smaller than that of a DRRM switch for long burst lengths.

Figure 9:
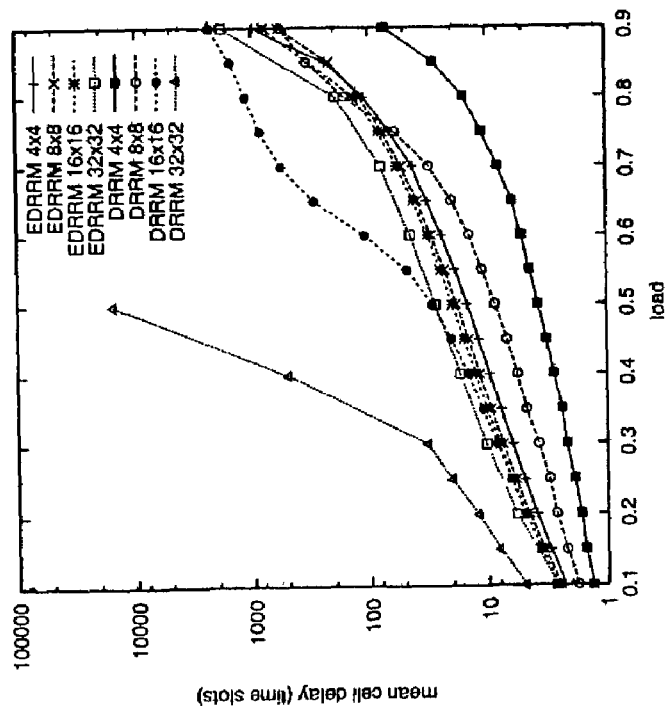

FIG. 9 compares the average cell delays of EDRRM and DRRM switches with different switch sizes when the average burst length is 16 cells. Note that as the switch size increases the average cell delay of a DRRM switch grows rapidly, while the average cell delay of an EDRRM switch grows more slowly. This indicates that cell delay for EDRRM is less sensitive to switch size than DRRM for bursty traffic.

The inventors believe that EDRRM is not sensitive to bursty traffic because all the cells arrive within the same burst will be served continuously so that little further delay will be suffered because of the burstiness. In DRRM or iSLIP, the service of cells in a burst is interleaved with service to other VOQ's, which may incur additional overhead due to unsuccessful requests. For cells belonging to a burst at a VOQ, when one cell is served, the next one cannot get service before all other nonempty VOQs at the same input have been served once.

C. Average Packet Delay

DRRM and EDRRM are fixed-length switching algorithms. Variable-length IP packets are segmented into fixed-length cells at the inputs, and the cells will be placed in the corresponding VOQ one by one. When a cell is transferred to its destination output, it will stay in a buffer and wait for the other cells in the same packet. After the complete reception of all the cells coming from the same packet, these cells will be reassembled into a packet. The delay a cell suffers before it is reassembled into a packet and delivered to its destination includes the cell delay discussed in the last subsection and waiting time at the output reassembly buffer. So the cell delay performance is not sufficient to evaluate the packet delay performance of a fixed-length switch.

In this subsection, average packet delay performance for the DRRM and EDRRM switches is analyzed. After a packet is segmented into cells, one cell will be put into the VOQ in each time slot. As in the article, M. Am Marsan, A. Bianco, P. Giaaccone, E. Leonardi, F. Neri, "Packet Scheduling in Input-Queued Cell-Based Switches," *IEEEINFOCOM* 2001, vol. 2 PP. 1085–1094, April, 2001, the packet delay of a packet is measured from the time when the last cell of the packet enters the VOQ until the time when the same last cell is transferred to its destined output. Simulation results show that the average packet delays of DRRM and iSLIP are similar to each other.

Figure 10:
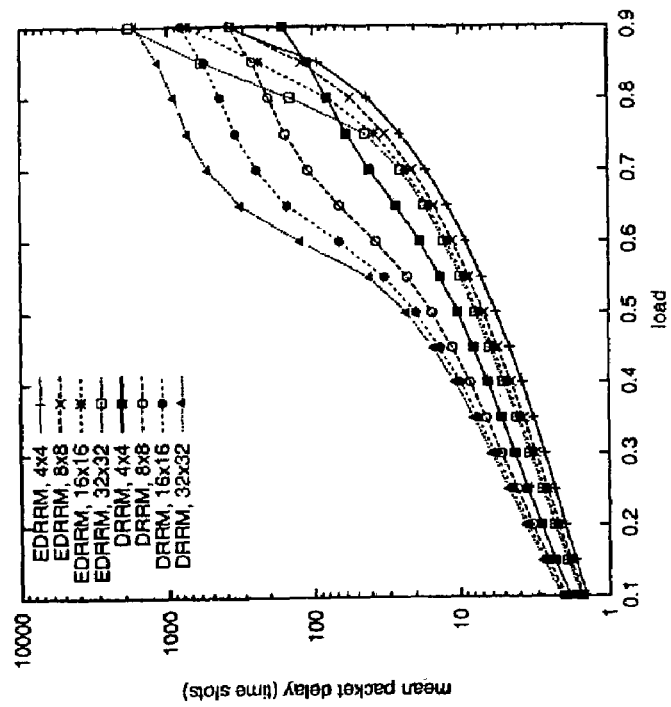

FIG. 10 compares the average packet delay of EDRRM and DRRM for different switch sizes under uniform i.i.d. Bernoulli traffic. The packet size is 10 cells. Note that the average packet delay of EDRRM is always comparable with or smaller than that of DRRM when the switch size is larger than 4, even when the average cell delay of DRRM is smaller than that of EDRRM. The reason is that in DRRM, when one cell in a VOQ is served, the next cell in the same VOQ needs to wait for its next turn. For example, under heavy load when all the VOQs are nonempty, after a cell is transferred the next cell in the same VOQ needs to wait at least N time slots to get a service. For the cells in one packet, each cell needs to wait some time in the output reassembly buffer for the next cell except the last one. On the other hand, in EDRRM all the cells in the same packet will be served continuously, and the number of time slots that the packet needs for reassembly in an output buffer is the packet size in cells. Therefore the packet delay of an EDRRM switch is the cell delay for the first cell of the packet plus the packet size in cell slot times. Indeed, an EDRRM switch is really a packet switch and not a cell switch emulating a packet switch since packets are sent contiguously through the switch fabric. As a result, EDRRM does not need a complex reassembly buffer at each output port.

Figure 11:
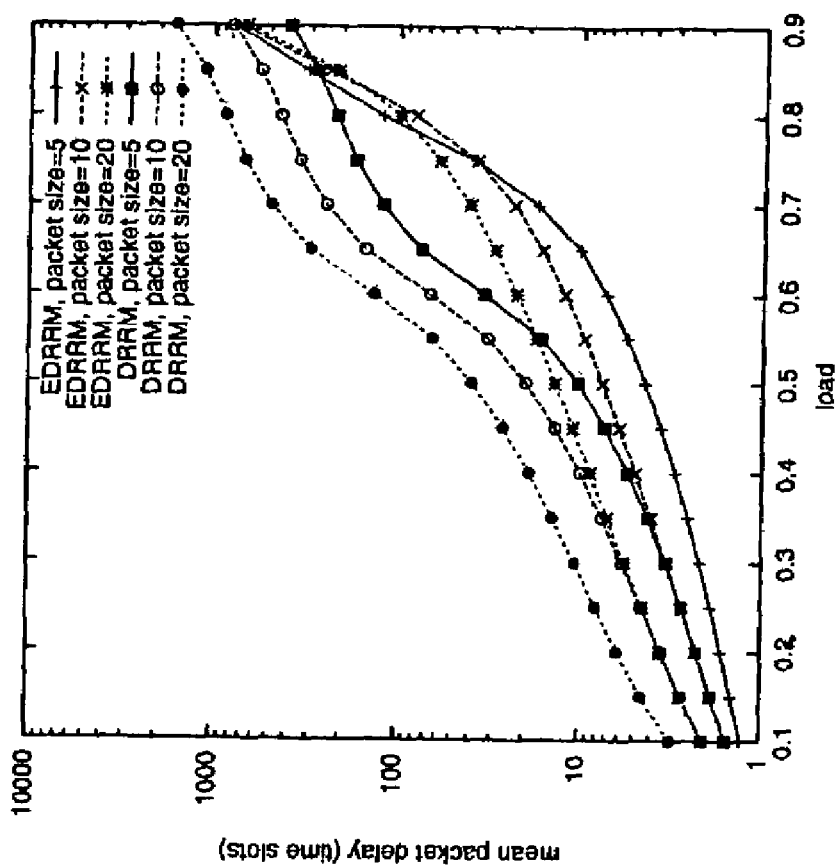

FIG. 11 shows the average packet delays of a 16×16 EDRRM switch and a DRRM switch with different packet sizes. Note that for an EDRRM switch, under light load, longer packets suffer longer packet delay, while under heavy load the average packet delays for packets with different sizes are similar. On the other hand, in a DRRM switch the average packet delay increases linearly with the packet size. Delay performance for priority traffic (e.g. real-time traffic) can be enhanced by introducing a high and low priority queue in each VOQ.

§ 5.7 Conclusions

In view of the foregoing, the arbitration technique and apparatus of the present invention has a switching fabric having an implementation complexity the same as that of DRRM, while packet reassembly is simpler than most other popular matching schemes. In a switch implementing the arbitration process of the present invention, when an input is matched with an output all the cells in the corresponding VOQ are served continuously before any other VOQ of the same input can be served. The performance of a switch using the arbitration process of the present invention is comparable to, or better than, a DRRM switch or an iSLIP switch for most traffic scenarios. Moreover, its average packet delay is lower and its not sensitive to either switch size of packet size. Furthermore, a switch using the arbitration process of the present invention is not sensitive to traffic burstiness. Under nonuniform traffic the throughputs of a DRRM switch and an ISLIP switch drop well below 100%, while the throughput of a switch using the arbitration process of the present invention is closer to 100%. To avoid unfairness under extreme traffic patterns such as "hot-spot", the maximum number of packets that can be served continuously in a VOQ can be bounded without changing the performance of EDRRM under other typical traffic scenarios.

What is claimed is:

1. For use with a switch having a first number of input ports, a second number of output ports, each of the input ports having the second number of virtual output queues, a method for arbitrating the dispatch of cells or packets stored in the virtual output queues, the method comprising:
   a) for each input port,
      i) choosing a next non-empty virtual output queue, and
      ii) sending a request to an arbiter for the output corresponding to the chosen non-empty virtual output queue; and
   b) for each output port arbiter,
      i) selecting a next input port associated with a request sent to the arbiter, thereby defining an input-output match, and
      ii) indicating to each input port associated with a request sent to the arbiter, whether or not its request was granted,
   wherein, for each input-output match, if the virtual output queue of the input corresponding to the output has any remaining cells, the virtual output queue will request and win a next arbitration for the output port.

2. The method of claim 1 wherein, for each input-output match, if the virtual output queue of the input corresponding to the output has any remaining cells, the virtual output queue will continue to request and win a subsequent consecutive arbitrations for the output port until the virtual output queue is empty.

3. The method of claim 1 wherein, for each input-output match, if the virtual output queue of the input corresponding to the output has any remaining cells, the virtual output queue will continue to request and win a subsequent consecutive arbitrations for the output port until a predetermined number of consecutive cells have been sent from the virtual output queue.

4. The method of claim 1 wherein the act of choosing a next non-empty virtual output queue is performed by updating a position of a pointer, associated with the virtual output queue, in accordance with a fixed scheme.

5. The method of claim 4 wherein the position of the pointer associated with the virtual output queue is updated if and only if the request associated with the virtual output queue was not granted.

6. The method of claim 4 wherein the position of the pointer associated with the virtual output queue is maintained if the request associated with the virtual output queue was granted.

7. The method of claim 1 wherein the act of choosing a next non-empty virtual output queue is performed by updating a position of a pointer, associated with the virtual output queue, in accordance with a round-robin scheme.

8. The method of claim 7 wherein the position of the pointer associated with the virtual output queue is updated if and only if the request associated with the virtual output queue was not granted.

9. The method of claim 7 wherein the position of the pointer associated with the virtual output queue is maintained if the request associated with the virtual output queue was granted.

10. The method of claim 1 wherein the act of selecting a next input port associated with a request sent to the arbiter, thereby defining an input-output match, is performed by updating a position of a pointer, associated with the input ports, in accordance with a fixed scheme.

11. The method of claim 10 wherein the position of the pointer is maintained if any request to the output port arbiter is granted.

12. The method of claim 1 wherein the act of selecting a next input port associated with a request sent to the arbiter, thereby defining an input-output match, is performed by updating a position of a pointer, associated with the input ports, in accordance with a round-robin scheme.

13. The method of claim 12 wherein the position of the pointer is maintained if any request to the output port arbiter is granted.

14. For use with a switch having a first number of input ports, a second number of output ports, each of the input ports having the second number of virtual output queues, an apparatus for arbitrating the dispatch of cells or packets stored in the virtual output queues, the apparatus comprising:
   a) for each input port,
      i) means for choosing a next non-empty virtual output queue, and
      ii) means for sending a request to an arbiter for the output corresponding to the chosen non-empty virtual output queue; and
   b) for each output port arbiter,
      i) means for selecting a next input port associated with a request sent to the arbiter, thereby defining an input-output match, and
      ii) means for indicating to each input port associated with a request sent to the arbiter, whether or not its request was granted,
   wherein, for each input-output match, if the virtual output queue of the input corresponding to the output has any remaining cells, the virtual output queue will request and win a next arbitration for the output port.

15. The apparatus of claim 14 wherein, for each input-output match, if the virtual output queue of the input corresponding to the output has any remaining cells, the virtual output queue will continue to request and win a subsequent consecutive arbitrations for the output port until the virtual output queue is empty.

16. The apparatus of claim 14 wherein, for each input-output match, if the virtual output queue of the input corresponding to the output has any remaining cells, the virtual output queue will continue to request and win a subsequent consecutive arbitrations for the output port until a predetermined number of consecutive cells have been sent from the virtual output queue.

17. The apparatus of claim 14 wherein the means for choosing a next non-empty virtual output queue updates a position of a pointer, associated with the virtual output queue, in accordance with a fixed scheme.

18. The apparatus of claim 17 wherein the means for choosing updates the position of the pointer associated with the virtual output queue if and only if the request associated with the virtual output queue was not granted.

19. The apparatus of claim 17 wherein the means for choosing maintains the position of the pointer associated with the virtual output queue if the request associated with the virtual output queue was granted.

20. The apparatus of claim 14 wherein the means for choosing a next non-empty virtual output queue updates a position of a pointer, associated with the virtual output queue, in accordance with a round-robin scheme.

21. The apparatus of claim 20 wherein the means for choosing updates the position of the pointer associated with the virtual output queue if and only if the request associated with the virtual output queue was not granted.

22. The apparatus of claim 20 wherein means for choosing maintains the position of the pointer associated with the virtual output queue if the request associated with the virtual output queue was granted.

23. The apparatus of claim 14 wherein the means for selecting a next input port associated with a request sent to the arbiter, thereby defining an input-output match, updates a position of a pointer, associated with the input ports, in accordance with a fixed scheme.

24. The apparatus of claim 23 wherein the means for selecting maintains the position of the pointer if any request to the output port arbiter is granted.

25. The apparatus of claim 14 wherein the means for selecting a next input port associated with a request sent to the arbiter, thereby defining an input-output match, updates a position of a pointer, associated with the input ports, in accordance with a round-robin scheme.

26. The apparatus of claim 25 wherein the means for selecting maintains the position of the pointer if any request to the output port arbiter is granted.

* * * * *